US011169580B2

(12) United States Patent
Lee et al.

(10) Patent No.: US 11,169,580 B2
(45) Date of Patent: Nov. 9, 2021

(54) DISPLAY DEVICE

(71) Applicant: Samsung Display Co., LTD., Yongin-si (KR)

(72) Inventors: Jungil Lee, Seoul (KR); Sungsang Ahn, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/896,351

(22) Filed: Jun. 9, 2020

(65) Prior Publication Data

US 2021/0034118 A1  Feb. 4, 2021

(30) Foreign Application Priority Data

Jul. 29, 2019  (KR) .................. 10-2019-0091569

(51) Int. Cl.
*G06F 1/16* (2006.01)

(52) U.S. Cl.
CPC .......... *G06F 1/1681* (2013.01); *G06F 1/1616* (2013.01); *G06F 1/1652* (2013.01)

(58) Field of Classification Search
CPC combination set(s) only.
See application file for complete search history.

(56) References Cited

U.S. PATENT DOCUMENTS

| 8,493,730 | B2 * | 7/2013 | Shim | G06F 1/1681 |
| | | | | 361/679.55 |
| 8,804,349 | B2 * | 8/2014 | Lee | H04M 1/0268 |
| | | | | 361/749 |
| 9,250,733 | B2 * | 2/2016 | Lee | H04M 1/022 |
| 9,557,771 | B2 * | 1/2017 | Park | G06F 1/1681 |
| 9,600,035 | B2 * | 3/2017 | Park | G06F 1/1681 |
| 9,697,941 | B2 * | 7/2017 | Lee | G02F 1/13 |
| 9,720,455 | B2 * | 8/2017 | Jang | G06F 1/1641 |
| 9,798,359 | B2 * | 10/2017 | Seo | G06F 1/1652 |
| 9,939,847 | B2 * | 4/2018 | Kee | H04M 1/0268 |
| 10,198,041 | B2 * | 2/2019 | Myeong | G02F 1/133305 |
| 10,244,641 | B2 | 3/2019 | Seo et al. | |
| 10,306,783 | B2 * | 5/2019 | Seo | H05K 5/0226 |
| 10,310,551 | B2 * | 6/2019 | Bae | G06F 1/16 |

(Continued)

FOREIGN PATENT DOCUMENTS

| KR | 10-1682491 B1 | 12/2016 |
| KR | 1020180007739 A | 1/2018 |

(Continued)

*Primary Examiner* — Lisa Lea-Edmonds
(74) *Attorney, Agent, or Firm* — Cantor Colburn LLP (57) ABSTRACT

A display device includes: a folding region and a non-folding region; a display module corresponding to the folding region and the non-folding region; a module supporter corresponding to the non-folding region and in which the display module is received; and a hinge corresponding to the folding region and rotatably connected to the module supporter. The hinge includes: a first joint and a second joint, a first rotator which rotatably connects the module supporter to the first joint, and a second rotator which rotatably connects the first joint to the second joint. The display module includes a first plane facing the module supporter, and a distance between the second rotator and the first plane is greater than a distance between the first rotator and the first plane.

20 Claims, 8 Drawing Sheets

(56) References Cited

U.S. PATENT DOCUMENTS

| | | | |
|---|---|---|---|
| 10,383,239 B2 | 8/2019 | Lee et al. | |
| 10,420,233 B2* | 9/2019 | Lee | H05K 5/0017 |
| 10,423,196 B2* | 9/2019 | Seo | G06F 1/1681 |
| 10,444,797 B2* | 10/2019 | Kee | G06F 1/1641 |
| 10,585,457 B2* | 3/2020 | Park | H01L 27/323 |
| 10,775,852 B2* | 9/2020 | Kim | G06F 1/1641 |
| 10,921,864 B2* | 2/2021 | Choi | G09F 9/301 |
| 10,948,947 B2* | 3/2021 | Yoon | G06F 1/1652 |
| 10,963,012 B2* | 3/2021 | Shin | G06F 3/0412 |
| 2016/0139634 A1* | 5/2016 | Cho | G06F 1/1652 |
| | | | 361/679.27 |
| 2017/0364123 A1* | 12/2017 | Seo | G06F 1/1652 |
| 2018/0011515 A1* | 1/2018 | Yoo | G06F 1/1626 |
| 2018/0024593 A1* | 1/2018 | Seo | G06F 1/1652 |
| | | | 361/679.27 |
| 2018/0307338 A1 | 10/2018 | Park | |
| 2020/0142447 A1* | 5/2020 | Yoon | G06F 1/1643 |

FOREIGN PATENT DOCUMENTS

| | | |
|---|---|---|
| KR | 1020180097195 A | 8/2018 |
| KR | 1020180098504 A | 9/2018 |
| KR | 1020180119197 A | 11/2018 |

\* cited by examiner

DISPLAY DEVICE

This application claims priority to Korean Patent Application No. 10-2019-0091569 filed on Jul. 29, 2019, and all the benefits accruing therefrom under 35 U.S.C. § 119, the entire contents of which are hereby incorporated by reference.

BACKGROUND

1. Field

The invention relates to a display device, and more particularly, to a hinge that corresponds to a folding region.

2. Description of the Related Art

Electronic products, such as smart phones, digital cameras, laptop computers, navigation systems and smart televisions, include a display device for displaying an image. The display devices generate an image and display the image on a display screen.

With the advancement of display technology, various type display devices have been being developed. A typical example of such display devices is a flexible display device that can be curvedly deformed, folded or rolled. The flexible display device capable of being deformed in various shapes allow for improvement in portability and convenience in using the flexible display device.

Among flexible display devices, the foldable display device includes a display module that is foldable about a folding axis extending in a direction. The display module is folded or opened about the folding axis.

SUMMARY

Embodiments of the invention provide a display device that reduces a bending stress applied to a display panel.

According to an embodiment, a display device includes: a display module corresponding to a folding region at which the display device is foldable and a non-folding region which is adjacent to the folding region; a module supporter corresponding to the non-folding region and in which the display module is received; and a hinge corresponding to the folding region and rotatably connected to the module supporter. The hinge includes: a first joint and a second joint, a first rotator which rotatably connects the module supporter to the first joint, and a second rotator which rotatably connects the first joint to the second joint. The display module includes a first plane facing the module supporter, and a distance between the second rotator and the first plane is greater than a distance between the first rotator and the first plane.

In an embodiment, the display module may include: a second plane which faces the first plane; a protective panel corresponding to the module supporter and the hinge, the protective panel defining the first plane; and a display panel corresponding to the module supporter and the hinge, the display panel defining the second plane.

In an embodiment, the second rotator may be closer to the second plane than the first rotator.

In an embodiment, the first rotator may define a first rotation axis between the first plane and the second plane.

In an embodiment, the second rotator may define a second rotation axis in the second plane.

In an embodiment, a first distance between the first plane and a first rotation axis that is defined by the first rotator may be less than a second distance between the first plane and a second rotation axis that is defined by the second rotator.

In an embodiment, the first distance may be half the second distance.

In an embodiment, the module supporter and the first joint may be rotatable about the first rotation axis at a first angle; the first joint and the second joint are may be rotatable about the second rotation axis at a second angle. The first angle may be less than the second angle.

In an embodiment, a ratio of the second angle to the first angle may correspond to a ratio of the second distance to the first distance.

In an embodiment, the first angle may be half the second angle.

In an embodiment, the display module may further include: a protective panel corresponding to the module supporter and the hinge, the protective panel having a thickness in a range from about 0.05 millimeter to 0.2 about millimeter; and a display panel corresponding to the module supporter and the hinge. The protective panel having the thickness in the range from about 0.05 millimeter to 0.2 about millimeter, may define the first plane, the first distance defined between the first plane and the first rotation axis may be in a range from about 0.025 millimeter to about 0.1 millimeter, and the second distance defined between the first plane and the second rotation axis may be in a range from about 0.05 millimeter to about 0.2 millimeter.

In an embodiment, the display device may be folded about a folding axis. The folding axis may be closer to the first plane than to the second plane.

In an embodiment, the module supporter may include: a bottom portion corresponding to the non-folding region; and a sidewall portion extended from the bottom portion and in which the display module is received. The first rotator may be rotatably connected to the module supporter at the sidewall portion thereof.

In an embodiment, the hinge may further include a first end and a second end opposing each other along the folding axis. At the first end of the hinge: the first joint of the hinge may include a first joint block rotatably connected to a first end of the sidewall portion by the first rotator; and a first connector extended along the folding axis, from the first joint block toward the second end of the hinge, and the second joint of the hinge may include a second joint block rotatably connected to the first joint block by the second rotator; and a second connector extended along the folding axis, from the second joint block toward the second end of the hinge.

In an embodiment, the first joint block may include: a first side surface facing the sidewall portion; and a second side surface opposite to the first side surface and facing the second joint block, the second side surface forming a first angle with the first side surface, and the second joint block may include: a first side surface which faces the second side surface of the first joint block; and a second side surface which is opposite to the first side surface of the second joint block, the second side surface of the second joint block forming a second angle with the first side surface of the second joint block, the second angle being the same as the first angle. The display device which is folded about the folding axis may dispose the first side surface and the second side surface of the first joint block, contacting the sidewall portion of the module supporter and the first side surface of the second joint block, respectively.

According to an embodiment, a display device includes: a display module corresponding to a folding region at which the display device is foldable and a non-folding region which is adjacent to the folding region; a module supporter corresponding to the non-folding region and in which the display module is received, the module supporter including a bottom portion and a sidewall portion which extends from the bottom portion; and a hinge corresponding to the folding region and rotatably connected to the module supporter. The display module includes a first plane facing the bottom portion of the module supporter, the hinge includes a first joint and a second joint in order along the display module, from the module supporter, the first joint and the second joint are rotatably connected to each other about a first rotation axis, the module supporter and the first joint are rotatably connected to each other about a second rotation axis, and a first distance between the first rotation axis and the first plane is greater than a second distance between the second rotation axis and the first plane.

In an embodiment, the display module may include: a second plane which faces the first plane; a display panel corresponding to the bottom portion of the module supporter and the hinge, the display panel defining the second plane; and a protective panel between the bottom portion of the module supporter and the display panel, the protective panel defining the first plane. The second rotation axis may be between the first plane and the second plane.

In an embodiment, the first distance may correspond to a thickness of the protective panel.

In an embodiment, the display module may further include an adhesive layer between the protective panel and the display panel. The first distance may correspond to a sum of a thickness of the protective panel and a thickness of the adhesive layer.

In an embodiment, the first joint and the second joint may be rotatable about the first rotation axis at a first angle, the module supporter and the first joint may be rotatable about the second rotation axis at a second angle. The first angle may be greater than the second angle.

BRIEF DESCRIPTION OF THE DRAWINGS

The above and other advantages and features of this disclosure will become more apparent by describing in further detail embodiments thereof with reference to the accompanying drawings, in which.

DETAILED DESCRIPTION

While the invention is open to various modifications and alternatives embodiments, embodiments thereof are shown by way of example in the drawings and will be described in detail. However, it should be understood that there is no intention to limit the invention to the particular embodiments disclosed, but on the other hand, the invention covers all modifications, equivalents, and alternatives falling within the spirit and scope thereof.

Like reference numerals refer to like elements in the description of each drawing. In the accompanying drawings, components are shown exaggerated in dimension for the sake of clarity of the invention. It will be understood that, although the terms first, second, etc. may be used herein to describe various components, these components should not be limited by these terms. These terms are only used to distinguish one component from another component. For example, a first component could be termed a second component, and vice versa without departing from the scope of the invention. Unless the context clearly indicates otherwise, the singular forms are intended to include the plural forms as well.

It will be understood that when an element is referred to as being related to another element such as being "on" another element, it can be directly on the other element or intervening elements may be present therebetween. In contrast, when an element is referred to as being related to another element such as being "directly on" another element, there are no intervening elements present.

Spatially relative terms, such as "beneath," "below," "above," "over" and the like, are used herein for ease of description to describe one element of features' relationship to another element(s) or feature(s) as illustrated in the figures. The relative terms are intended to encompass different orientations in addition to the orientation depicted in the drawings.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It should be understood that the terms "comprise," "include," "have" and the like are used to specify the presence of stated features, integers, steps, operations, components, elements, or combinations thereof, but do not preclude the presence or addition of one or more other features, integers, steps, operations, components, elements, or combinations thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 1:
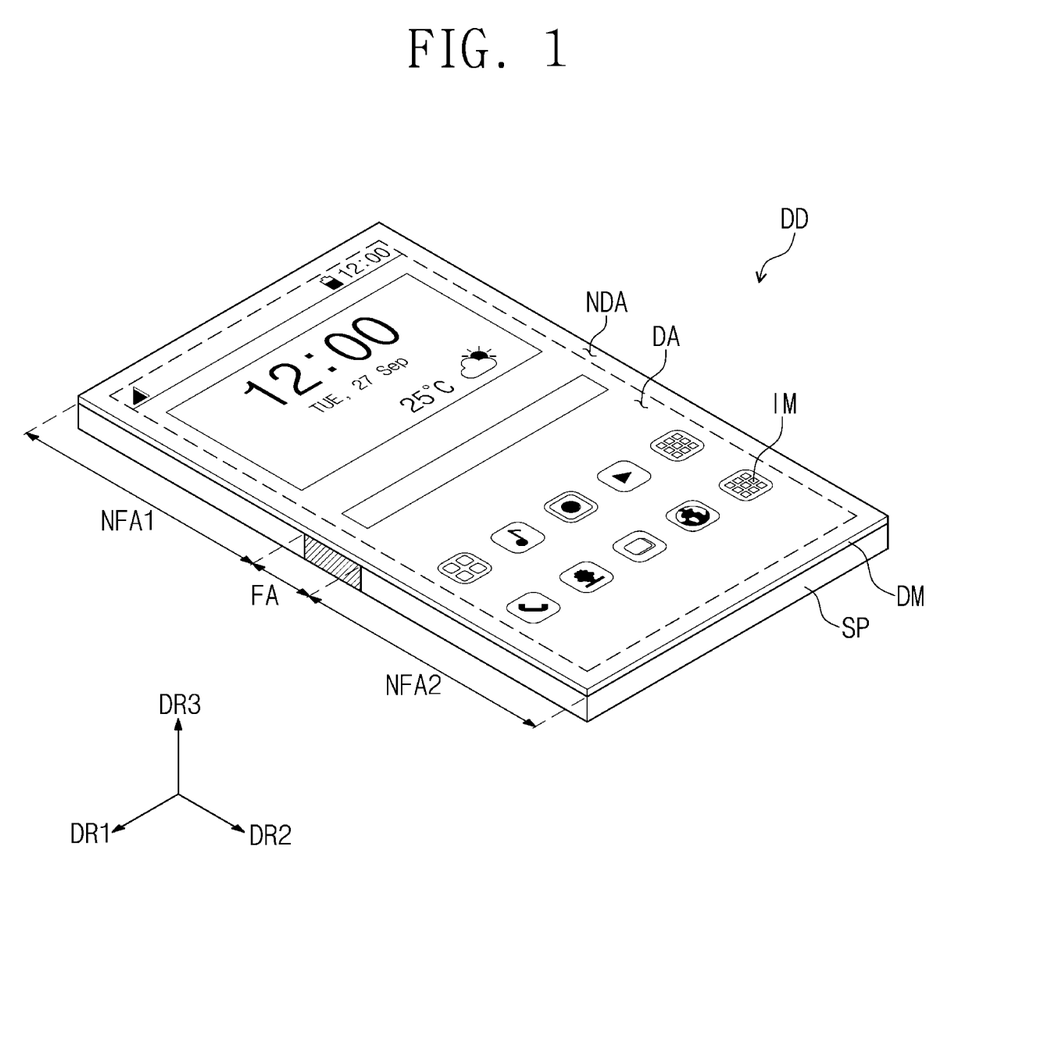
FIG. 1 illustrates a perspective view showing an embodiment of a display device.
Figure 2:
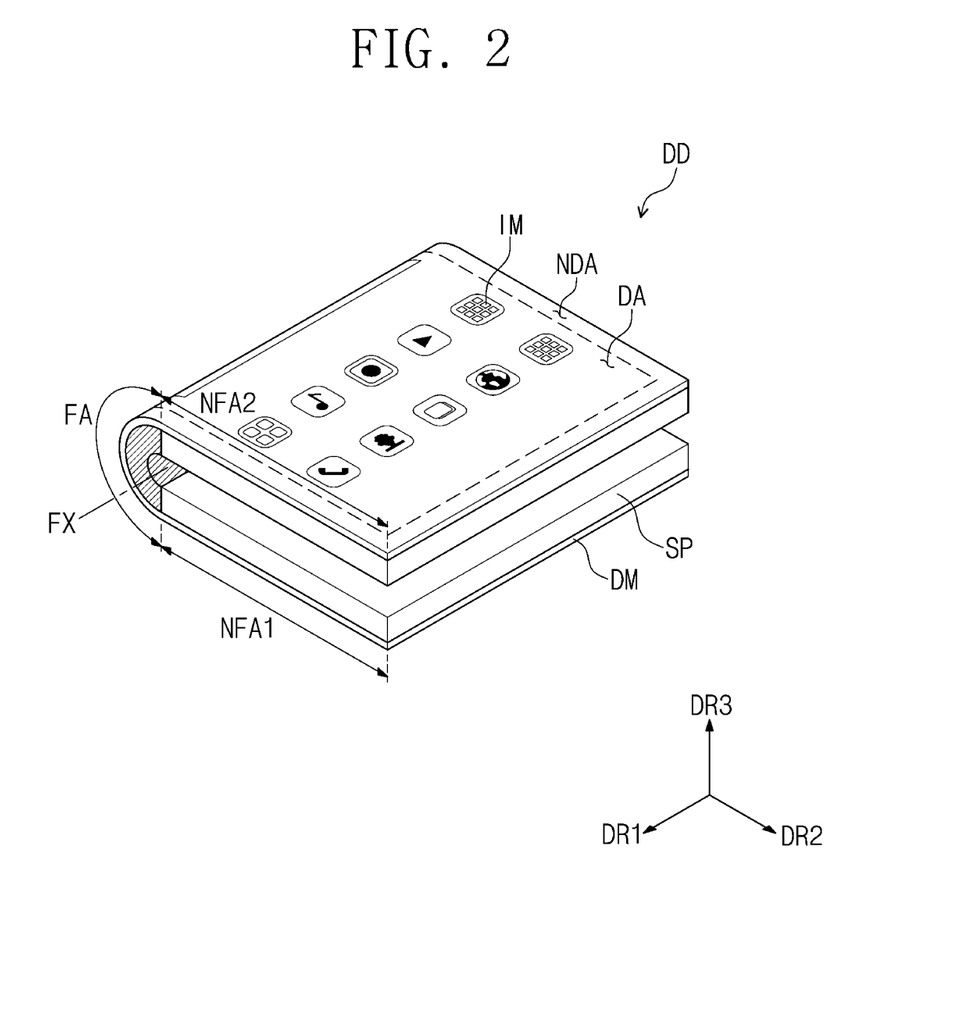
FIG. 2 illustrates a perspective view showing the display device depicted in FIG. 1, which is folded.

FIG. 1 illustrates a perspective view showing an embodiment of a display device DD. FIG. 2 illustrates a perspective view showing the display device DD depicted in FIG. 1, which is folded.

Referring to FIGS. 1 and 2, a display device DD may have a rectangular shape that has relatively shorter sides extended along a first direction DR1 and relatively longer sides extended along a second direction DR2 intersecting the first direction DR1. A thickness of the display device DD and components thereof is extended along a third direction DR3 intersecting each of the first direction DR1 and the second direction DR2. The invention, however, is not limited thereto, and the display device DD may have various shapes. The display device DD may be flexible (e.g., a flexible display device), such as a foldable display device DD that is folded or opened about a folding axis FX extending along the first direction DR1.

The display device DD may include a display module DM and a supporter SP which is disposed corresponding to the display module DM. The display module DM may flexible (e.g., a flexible display module). A top surface of the display module DM may be defined as a display surface. The display surface may be disposed in a plane defined by the first and second directions DR1 and DR2. An image IM generated by the display module DM may be provided in plural (e.g., images IM) at the display surface. The images IM may be visible from outside the display device DD, such as to provide users of the display device DD with the images IM generated from the display module DM.

The display surface may include a display region DA in which the images IM are displayed and a non-display region NDA around the display region DA. The non-display region NDA adjacent to the display region DA. The non-display region NDA may surround the display region DA, without being limited thereto. The non-display region NDA include an area printed with a color, to define an edge region of the display device DD having the edge region printed with a color.

The display module DM may include a folding region FA and a non-folding region provided in plural (e.g., a plurality of non-folding regions NFA1 and NFA2). The display device DD and various components thereof may include a folding region FA and a non-folding region which correspond to those of the display module DM. The display device DD, the display module DM and various components thereof may be foldable at the folding region FA. At the non-folding region, the display device DD, the display module DM and various components thereof may be non-foldable or may be maintained flat even in folding of the display device DD or components thereof. Although one folding region FA and two non-folding regions NFA1 and NFA2 are exemplarily illustrated, limitations are imposed on neither the number of the folding region FA nor the number of the non-folding regions NFA1 and NFA2.

Referring to FIGS. 1 and 2, for example, the folding region FA may be disposed between a first non-folding region NFA1 and a second non-folding region NFA2 (e.g., first and second non-folding regions NFA1 and NFA2). The folding region FA and the first and second non-folding regions NFA1 and NFA2 may be arranged along the second direction DR2. The folding region FA may correspond to or overlap the folding axis FX.

The supporter SP may support the display module DM, and may be rotatable and foldable about the folding axis FX. The folding of the supporter SP may fold the display module DM. That is, the supporter SP and the display module DM may be foldable together with each other. In an embodiment, for example, bending of the supporter SP at the folding region FA thereof may cause folding of the display module DM thereof. When the display device DD may be in-folded or out-folded. Referring to FIG. 2, for example, folding of the supporter SP may out-fold the display device DD to externally expose the display surface of the display module DM (e.g., portions of the display surface face away from each other). The supporter SP will be further discussed in detail below.

Figure 3:
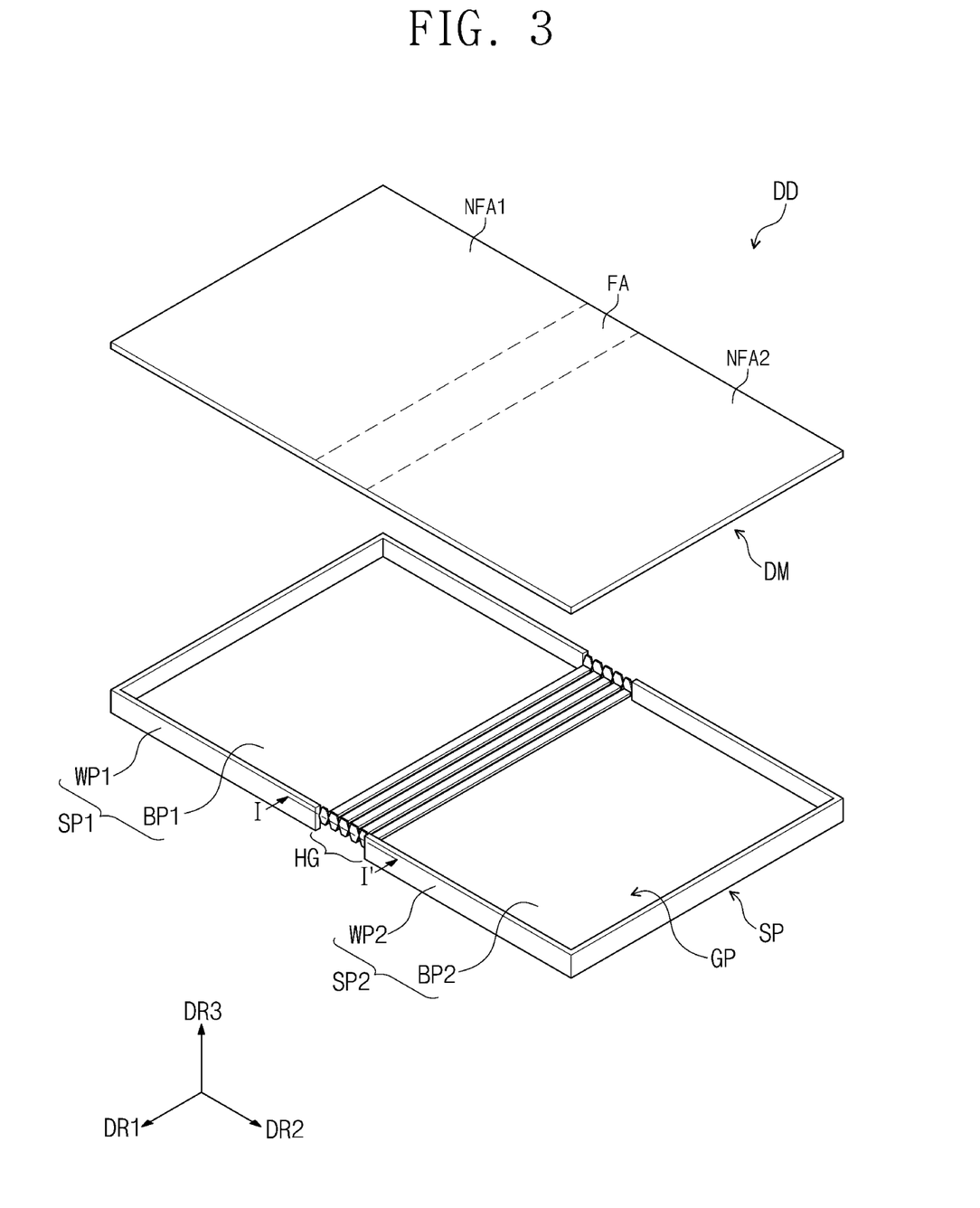
FIG. 3 illustrates an exploded perspective view showing the display device of FIG. 1.

FIG. 3 illustrates an exploded perspective view of an embodiment of the display device DD of FIG. 1. Referring to FIG. 3, the display device DD may include a display module DM and a supporter SP. The display module DM may correspond to the display module DM of FIGS. 1 and 2, and the supporter SP may correspond to the supporter SP of FIGS. 1 and 2. The supporter SP may include a first module supporter SP1 (e.g., first supporter portion), a second module supporter SP2 (e.g., a second supporter portion), and a hinge HG.

The first module supporter SP1 may correspond to or overlap the first non-folding region NFA1. The first module supporter SP1 may include a first bottom part BP1 (e.g., first bottom portion) and a first sidewall part WP1 (e.g., first sidewall portion). The first bottom part BP1 may correspond to the first non-folding region NFA1 of the display module DM, and thus may support the first non-folding region NFA1. The first bottom part BP1 may overlap the first non-folding region NFA1. The first sidewall part WP1 may extend along the third direction DR3 from the first bottom part BP1. The first sidewall part WP1 may include portions lengthwise extending variously along the first direction DR1 and the second direction DR2 to provide a sidewall that surrounds at least a portion of the display module DM in a top plan view. The first sidewall part WP1 may be open toward the hinge HG.

The second module supporter SP2 may correspond to or overlap the second non-folding region NFA2. The second module supporter SP2 may include a second bottom part BP2 (e.g., second bottom portion) and a second sidewall part WP2 (e.g., second sidewall portion). The second bottom part BP2 may correspond to the second non-folding region NFA2 of the display module DM, and thus may support the second non-folding region NFA2. The second bottom part BP2 may overlap the second non-folding region NFA2. The second sidewall part WP2 may extend along the third direction DR3 from the second bottom part BP2. The second sidewall part WP2 may include portions lengthwise extending variously along the first direction DR1 and the second direction DR2 to provide a sidewall that surrounds at least a portion of the display module DM in the top plan view. The second sidewall part WP2 may be open toward the hinge HG.

The hinge HG may correspond to the folding region FA. The hinge HG may be positioned between the first module supporter SP1 and the second module supporter SP2 along the second direction DR2. The hinge HG may lengthwise extend along the first direction DR1. The hinge HG, the first module supporter SP1 and the second module supporter SP2 may be arranged along the second direction DR2. The first module supporter SP1 and the second module supporter SP2 may be connected to opposite sides of the hinge HG which face each other along the second direction DR2.

The hinge HG may include a joint provided in plural (e.g., a plurality of joints) that are each rotatable about an axis (e.g., rotation axis) extended along the first direction DR1. A first joint may be connected to a first side of the first module supporter SP1. In an embodiment, for example, a first joint among the plurality of joints may be connected to a first side of the first sidewall part WP1. A second joint among the plurality of joints may be connected to a first side of the second module supporter SP2 which faces the first module supporter SP1. In an embodiment, for example, a second joint among the plurality of joints may be connected to a first side of the second sidewall part WP2. A single one of the joint may be provided to have opposite sides to which one or more among the plurality of joints are connected. The plurality of joints may facilitate folding of the display module DM, such as about one or more of the rotation axis. The plurality of joints will be further discussed in detail below.

A groove GP may be defined by a collection of the first module supporter SP1, the second module supporter SP2 and the hinge HG. Connection of the first and second module supporters SP1 and SP2 to the hinge HG define the groove GP as a continuous space along the first module supporter SP1, the second module supporter SP2 and the hinge HG. The groove GP may receive the display module DM. That is, the hinge HG, the first sidewall part WP1, the first bottom part BP1, the second sidewall part WP2 and the second bottom part BP2 may together define the groove GP as a receiving space, without being limited thereto.

Figure 4:
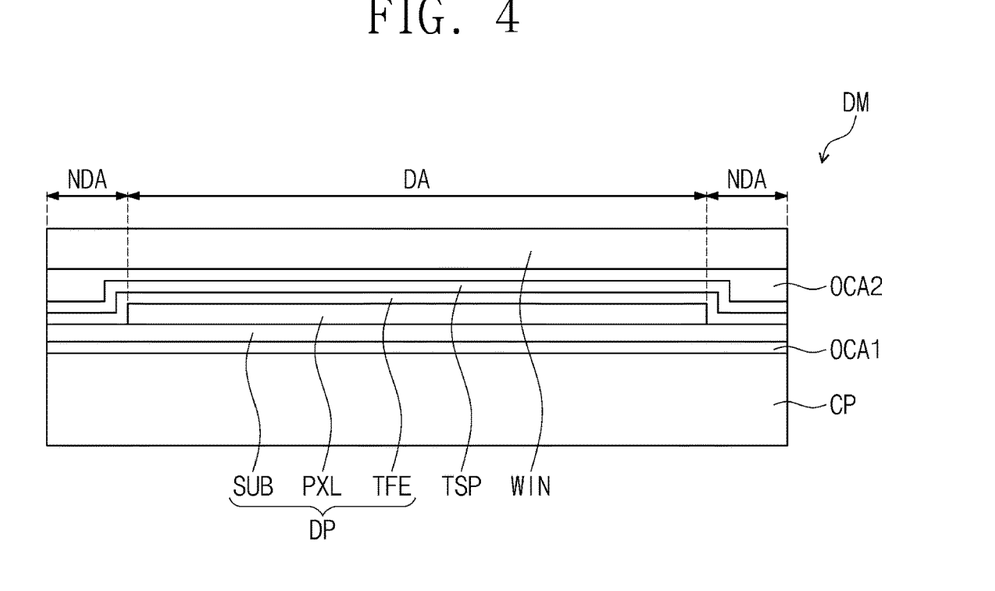
FIG. 4 illustrates a cross-sectional view showing an embodiment of a display module of FIG. 3.

FIG. 4 illustrates a cross-sectional view showing an embodiment of the display module DM of FIG. 3. Referring to FIG. 4, the display module DM may include a protective panel CP, a display panel DP, an input sensing part TSP (e.g., input sensing layer), a window WIN, a first adhesive layer OCA1 and a second adhesive layer OCA1 (e.g., first and second adhesive layers OCA1 and OCA2).

The protective panel CP is disposed on the supporter SP of FIGS. 1 to 3. The protective panel CP may be disposed closest to a bottom portion of the supporter SP, along a thickness direction (e.g., third direction DR3). The protective panel CP may have a sheet shape. The protective panel CP may include a cushion material to reduced or effectively prevent impact or damage caused by direct contact between the supporter SP and the display panel DP. The protective panel CP may reduce or effectively prevent impact or damage to the display panel DP due to folding thereof facilitated by folding of the hinge HG shown in FIG. 3.

The display panel DP may be disposed on the protective panel CP. The display panel DP may be attached to the protective panel CP through the first adhesive layer OCA1. In an embodiment, for example, the first adhesive layer OCA1 may include, but is not limited to, an optical clear adhesive or a phase change adhesive. The display panel DP may be a display panel DP which generates and emits light (e.g., a light emitting display panel), but the invention is not limited thereto. In an embodiment, for example, the display panel DP may be an organic light emitting display panel or a quantum-dot light emitting display panel. An emission layer of the organic light emitting display panel may include an organic light emitting material. An emission layer of the quantum-dot light emitting display panel may include a quantum-dot or a quantum-rod. The following will describe an example in which the display panel DP is an organic light emitting display panel.

The display panel DP may be flexible (e.g., a flexible display panel). The display panel DP may include a substrate SUB, a pixel layer PXL (e.g., an image display layer) disposed on the substrate SUB, and a thin-film encapsulation layer TFE (e.g., encapsulation layer) disposed on the substrate SUB so as to cover the pixel layer PXL. The substrate SUB may include a transparent flexible plastic substrate. In an embodiment, for example, the substrate SUB may include polyimide ("PI").

The substrate SUB may include a display region DA and a non-display region NDA which is adjacent to the display region DA. The pixel layer PXL may be disposed corresponding to the display region DA. The pixel layer PXL may include a pixel PX provided in plural (e.g., a plurality of pixels PX), and each of the pixels PX may include a light emitting element which generates and/or emits light.

The thin-film encapsulation layer TFE may include at least two inorganic layers and an organic layer which is between the inorganic layers. The inorganic layers may include an inorganic material, and may protect the pixel layer PXL against moisture and/or oxygen. The organic layer may include an organic material, and may protect the pixel layer PXL against foreign substances such as dust.

The input sensing part TSP may be disposed on the thin-film encapsulation layer TFE. The input sensing part TSP may detect an external input (e.g., from an input tool such as a user's hand or a touch pen) and may convert the external input into an input signal. The input sensing part TSP may include a plurality of sensing electrodes with which the external input is detected. In an embodiment, for example, the sensing electrodes may use a capacitive type method to detect the external input. The input sensing part TSP may be directly provided or formed on the thin-film encapsulation layer TFE in one or more embodiment of fabricating the display module DM. The invention, however, is not limited thereto. In an embodiment, for example, the input sensing part TSP may be fabricated in the form of a touch panel which is separate from the display panel DP, and may be attached to the display panel such as through an adhesive layer.

The window WIN may protect the display panel DP and the input sensing part TSP against external scratches and impact. The window WIN may be attached to the input sensing part TSP such as through the second adhesive layer OCA2. In an embodiment, for example, the second adhesive layer OCA2 may include an optical clear adhesive. An image generated from the display panel DP may pass through the input sensing part TSP and/or the window WIN to be visible from outside the display device DD.

Figure 5:
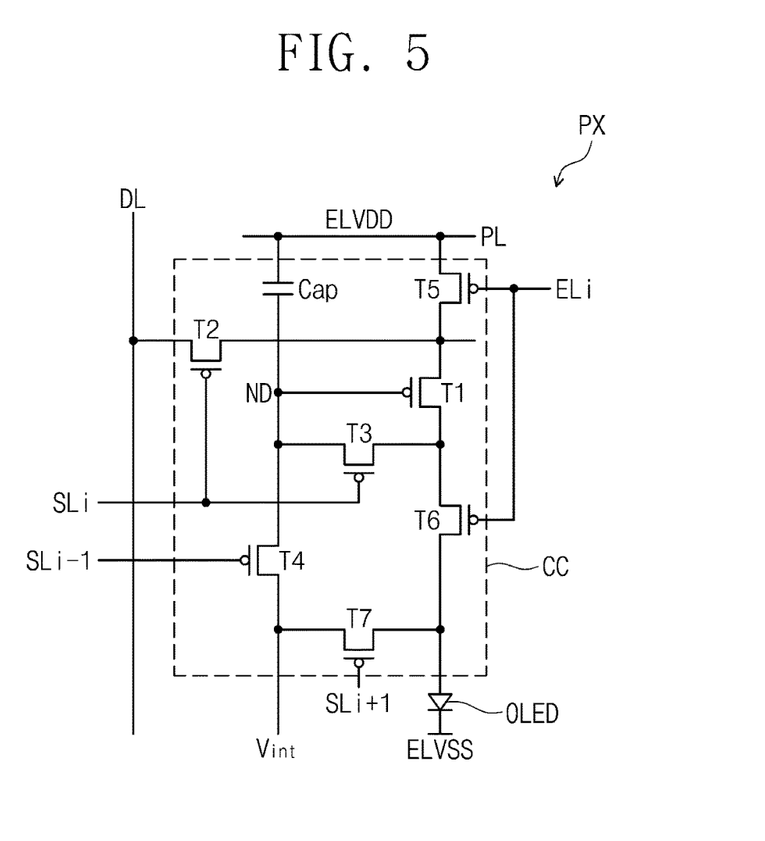
FIG. 5 illustrates an equivalent circuit diagram showing an embodiment of a pixel included in the display module of FIG. 4.

FIG. 5 illustrates an equivalent circuit diagram showing an embodiment of a pixel PX included in the pixel layer PXL of FIG. 4. Referring to FIG. 5, a pixel PX may include a light emitting element OLED and a pixel circuit CC which is connected to the light emitting element OLED. The light emitting element OLED may be an organic light emitting element. The pixel circuit CC may include a transistor provided in plural (e.g., plurality of transistors T1 to T7 or first to seventh transistors T1 to T7) and a capacitor Cap. In response to an electrical signal such as a data voltage, the pixel circuit CC may control an amount of electrical current that flows through the light emitting element OLED to drive or control the light emitting element OLED to generate and/or emit light.

The light emitting element OLED may emit light at a certain brightness level in response to an amount of electrical current provided from the pixel circuit CC. For this purpose, among electrical signals, a first voltage ELVDD may be set to a higher level than that of a second voltage ELVSS.

Each of first to seventh transistors T1 to T7 may include an input electrode (e.g., a source electrode), an output electrode (e.g., a drain electrode), and a control electrode (e.g., a gate electrode). For convenience of description, one of the input and output electrodes may be called a first electrode, and the other of the input and output electrodes may be called a second electrode.

The first electrode of the first transistor T1 may be coupled through the fifth transistor T5 to a power line PL that applies the first voltage ELVDD, and the second electrode of the first transistor T1 may be coupled through the sixth transistor T6 to an anode electrode of the light emitting element OLED. The first transistor T1 may be called a driving transistor in this description. According to a voltage as an electrical signal applied to the control electrode of the first transistor T1, the first transistor T1 may control an amount of electrical current that flows through the light emitting element OLED.

The second transistor T2 may be coupled between a signal line such as a data line DL and the first electrode of the first transistor T1, and the control electrode of the second transistor T2 may be coupled to a signal line such as an $i^{th}$ scan line SLi. When the second transistor T2 is provided with an $i^{th}$ scan signal from the $i^{th}$ scan line SLi, the second transistor T2 may be turned on to electrically couple the data line DL to the first electrode of the first transistor T1.

The third transistor T3 may be coupled between the second electrode and the control electrode of the first transistor T1. The control electrode of the third transistor T3 may be coupled to the $i^{th}$ scan line SLi. When the third transistor T3 is provided with an electrical signal such as the $i^{th}$ scan signal from the $i^{th}$ scan line SLi, the third transistor T3 may be turned on to electrically couple the second and control electrodes of the first transistor T1 to each other. When the third transistor T3 is turned on, the first transistor T1 may be coupled in a diode type.

The fourth transistor T4 may be coupled between a node ND and an initialization power generator (not shown). The control electrode of the fourth transistor T4 may be coupled to a signal line such as an $(i-1)^{th}$ scan line SLi-1. When the fourth transistor T4 is provided with an electrical signal such as an $(i-1)^{th}$ scan signal Si-1 from the $(i-1)^{th}$ scan line SLi-1, the fourth transistor T4 may be turned on to provide the node ND with an electrical signal such as an initialization voltage $V_{int}$.

The fifth transistor T5 may be coupled between the power line PL and the first electrode of the first transistor T1. The control electrode of the fifth transistor T5 may be coupled to a signal line such as an $i^{th}$ emission line ELi.

The sixth transistor T6 may be coupled between the second electrode of the first transistor T1 and the anode electrode of the light emitting element OLED. The control electrode of the sixth transistor T6 may be coupled to the $i^{th}$ emission line ELi.

The seventh transistor T7 may be coupled between the initialization power generator (not shown) and the anode electrode of the light emitting element OLED. The control electrode of the seventh transistor T7 may be coupled to a signal line such as an $(i+1)^{th}$ scan line SLi+1. When the seventh transistor T7 is provided with an electrical signal such as an $(i+1)^{th}$ scan signal Si+1 from the $(i+1)^{th}$ scan line SLi+1, the seventh transistor T7 may be turned on to provide the initialization voltage $V_{int}$ to the anode electrode of the light emitting element OLED.

When the seventh transistor T7 is turned on, a parasitic capacitance (not shown) of the light emitting element OLED may be discharged. Accordingly, when black brightness is implemented at the pixel PX, a leaked electrical current from the first transistor T1 may not allow the light emitting element OLED to emit light, and as a result, there is an increased possibility of the pixel PX representing black.

The capacitor Cap may be disposed between the power line PL and the node ND. The capacitor Cap may store the data voltage. When the fifth and sixth transistors T5 and T6 are turned on due to the voltage stored in the capacitor Cap, an amount of electrical current that flows through the first transistor T1 may be determined or defined.

Figure 6:
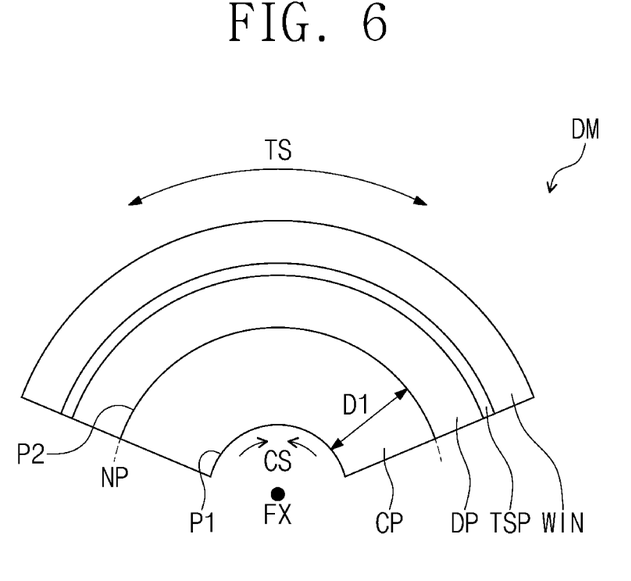
FIG. 6 illustrates a cross-sectional view showing he display module depicted in FIG. 4, which is folded.

FIG. 6 illustrates a cross-sectional view showing an embodiment of the display module DM depicted in FIG. 4, which is folded. Referring to FIG. 6, the display module DM may include a protective panel CP, a display panel DP, an input sensing part TSP and a window WIN, which respectively correspond to the protective panel CP, the display panel DP, the input sensing part TSP and the window WIN that are discussed in FIG. 4. As mentioned previously, in order, the display panel DP may be disposed on the protective panel CP, the input sensing part TSP may be placed on the display panel DP, and the window WIN may be positioned on the input sensing part TSP.

The display module DM may fold about the folding axis FX discussed in FIG. 2. The folding axis FX may be provided or defined below the protective panel CP, or provided external to the display module DM at a position which faces the display panel DP with the protective panel CP therebetween. Referring to FIG. 6, the display module DM may be out-folded along the folding axis FX positioned external to the display module DM.

Folding of the display module DM provides a bending stress to the display module DM at various layers thereof. The bending stress may include a tensile stress TS and a compressive stress CS. The tensile stress TS may refer to force outwardly directed along the folding direction of the display module DM. The compressive stress CS may refer to force inwardly concentrated along the folding direction of the display module DM.

Folding of the display module DM may provide a neutral plane NP where neither the tensile stress TS nor the compressive stress CS occurs. A portion of the display module DM corresponding to the neutral plane NP may not produce force due to the folding of the display module DM. Therefore, the portion of the display module DM corresponding to the neutral plane NP may be less impacted or damaged than other portions of the display module DM. The neutral plane NP may serve as a boundary to distinguish a region in the display module DM where the tensile stress TS occurs from a region of the display module DM where the compressive stress CS occurs.

The neutral plane NP may be determined based on which portion of the display module DM is provided with a rotation axis. The rotation axis may be different from the folding axis FX. In order to allow the display module DM to fold about the folding axis FX, a plurality of joints which will be discussed below, may rotate about different rotation axes. In this sense, the rotation axis discussed herein is defined to refer to a rotation axis about which is rotated a rotator included in the hinge HG of FIG. 3. That is, the display device DD and/or various components thereof may be rotatable about one or more a rotation axis, to fold the display device DD and/or various components thereof about the folding axis FX.

In an embodiment, for example, when the rotation axis is provided on or near a first plane P1 that corresponds to a rear surface of the display module DM, the neutral plane NP may be provided or formed at or near a location of the first plane P1. In this case, the tensile stress TS may be applied to the protective panel CP, the display panel DP, and the window WIN. The tensile stress TS or the compressive stress CS may increase as a distance from the neutral plane NP increases along a direction perpendicular to the neutral plane NP. In an embodiment, for example, the closer the neutral plane NP is to the first plane P1, the greater the tensile stress TS is applied to the display panel DP. The display panel DP may be damaged due to the greater amount of the tensile stress TS from the folding of the display module DM.

The closer the rotation axis is to the display panel DP, the nearer the neutral plane NP is to the display panel DP. In an embodiment, for example, when the rotation axis is provided on or near a second plane P2 of the display panel DP, which second plane P2 faces the protective panel CP, the neutral plane NP may be provided or formed at or near (e.g., corresponding to) a location of the second plane P2. In this case, the display panel DP may be applied with a reduced bending stress. As being applied with the reduced bending stress, a reliability of the display panel DP may be increased.

To secure reliability of the display panel DP, at least one joint among a plurality of joints (see H1 to H5 of FIG. 7) may have a rotation axis that is provided on or near the second plane P2. The second plane P2 may be spaced apart at a first distance D1 from the first plane P1. In an embodiment, for example, the first distance D1 may correspond to a thickness of the protective panel CP. When the protective panel CP and the display panel DP have therebetween at least one layer having a certain thickness, such as the first adhesive layer OCA1 of FIG. 4, the first distance D1 may correspond to a sum or total of thicknesses of the protective panel CP and the first adhesive layer OCA1.

Figure 7:
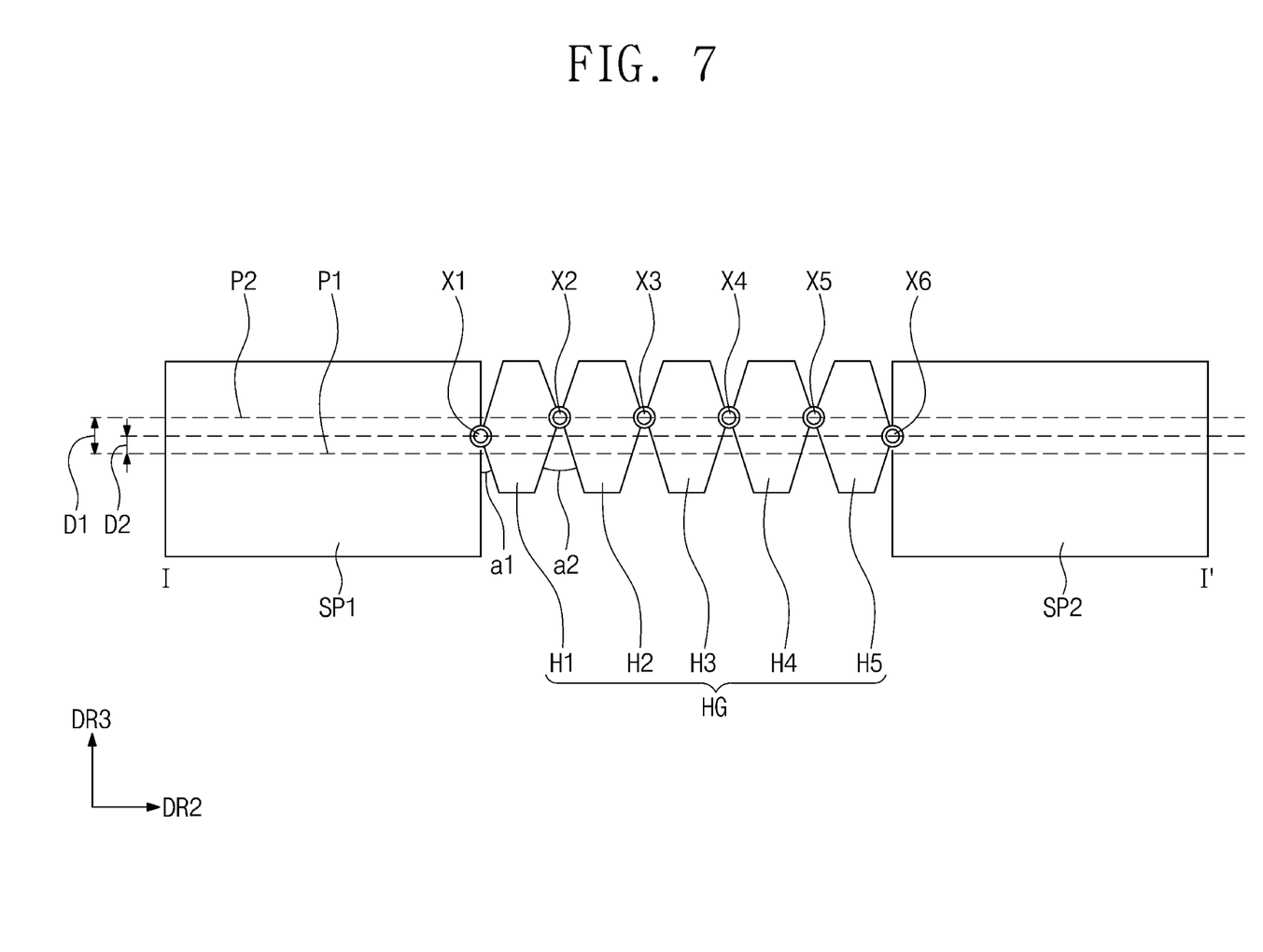
FIG. 7 illustrates a cross-sectional view taken along line I-I' of FIG. 3.
Figure 8:
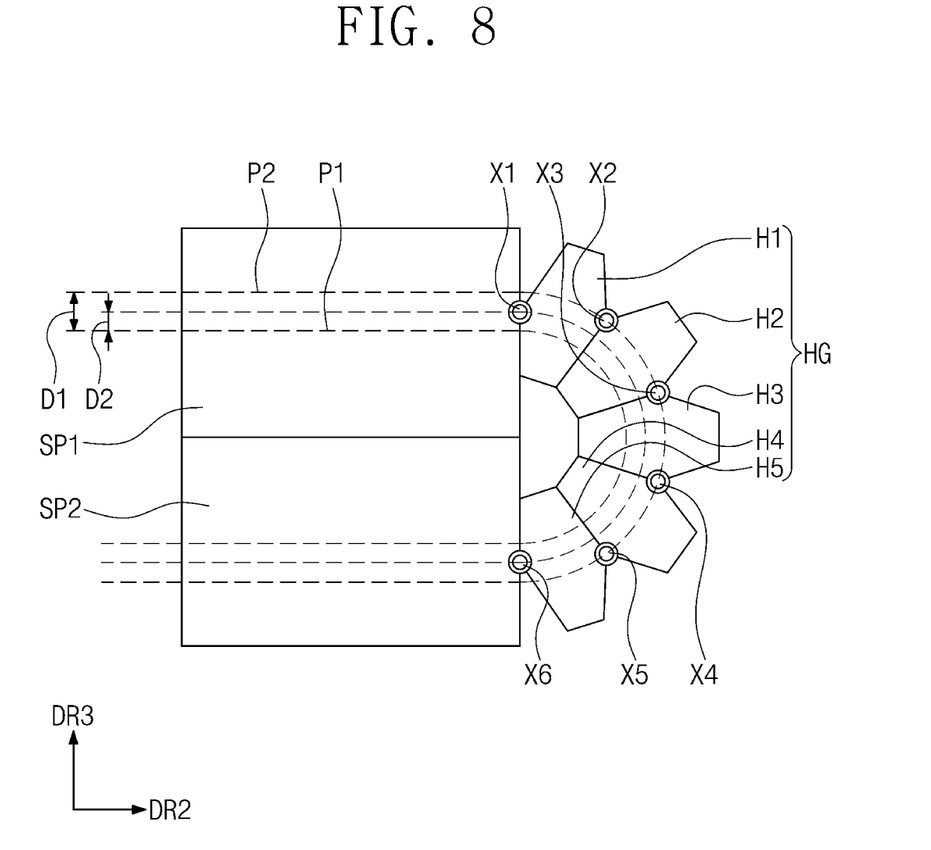
FIG. 8 illustrates a cross-sectional view showing an embodiment of a supporter depicted in FIG. 7, which is folded.

FIG. 7 illustrates an enlarged cross-sectional view taken along line I-I' of FIG. 3. FIG. 8 illustrates an enlarged cross-sectional view showing the supporter SP depicted in FIG. 7, which is folded. FIGS. 7 and 8 show the hinge HG whose structure is configured, as discussed in FIG. 6, to place the neutral plane NP in position adjacent or corresponding to the display panel DP. FIGS. 7 and 8 depict a cross-sectional structure of a portion of the supporter SP, showing the first module supporter SP1, the second module supporter SP2 and the hinge HG. The hinge HG may be disposed between the first module supporter SP1 and the second module supporter SP2.

Referring to FIGS. 7 and 8, the hinge HG may include a plurality of joints H1 to H5 and a plurality of rotators X1 to X6. Although five joints H1 to H5 are illustrated, the number of the joints H1 to H5 is not limited to five. Each one of the plurality of joints H1 to H5 may be connected to at least another one joint among the plurality of joints H1 to H5. In an embodiment, for example, each of first and fifth joints H1 and H5 may be connected to a single one joint respectively adjacent thereto, and each of second, third and fourth joints H2, H3 and H4 may be connected between two joints respectively adjacent thereto at opposing sides of the second, third and fourth joints H2, H3 and H4.

A first side of the first joint H1 may be connected to a first side of the first module supporter SP1. The first side of the first module supporter SP1 may be an end of the first sidewall part WP1 shown in FIG. 3. The first joint H1 and the first module supporter SP1 may be connected to each other through a first rotator X1. The first joint H1 and the first module supporter SP1 may be rotatable with respect to each other at the first rotator X1. The first rotator X1 may be a protrusion or recession which is defined by a portion of at least of the first joint H1 and the first module supporter SP1. Alternatively, the first rotator X1 may be an individual component separate from the first joint H1 and the first module supporter SP1 and provided between the first joint H1 and the first module supporter SP1. In an embodiment, for example, the first rotator X1 may be a pin that provides or defines a rotation axis between the first joint H1 and the first module supporter SP1. One or more of the first joint H1 and the first module supporter SP1 may rotate about the first rotator X1. The first rotator X1 may define a first rotation axis. The first rotation axis may be created or defined at the first rotator X1. The first rotation axis may be between the first plane P1 and the second plane P2.

A first side of the second joint H2 may be connected to a second side of the first joint H1 which is opposite to the first side thereof. The first and second joints H1 and H2 may be connected to each other through a second rotator X2. The second rotator X2 may be a protrusion or recession which is defined by a portion of at least of the first and second joints H1 and H2. Alternatively, the second rotator X2 may be an individual component separate from the first and second joints H1 and H2, such as a pin, that provides a rotation axis between the first and second joints H1 and H2. One or more of the first and second joints H1 and H2 may be rotatable about the second rotator X2. The second rotator X2 may define a second rotation axis. The second rotation axis may be created or defined at the second rotator X2. The first and second joints H1 and H2 may be rotatable with respect to each other at the second rotator X2 (e.g., along the second rotation axis).

Similar to the second joint H2, the third joint H3 may be connected to the second joint H2 through a third rotator X3, and the fourth joint H4 may be connected to the third joint H3 through a fourth rotator X4. The third rotator X3 may define a third rotation axis, and the fourth rotator X4 may define a fourth rotation axis.

Similar to the first joint H1, a first side of the fifth joint H5 may be connected to the fourth joint H4, and a second side of the fifth joint H5 which is opposite to the first side thereof may be connected to the second module supporter SP2. The fourth and fifth joints H4 and H5 may be connected to each other through a fifth rotator X5 that defines a fifth rotation axis. The fifth joint H5 and the second module supporter SP2 may be connected to each other through a sixth rotator X6.

The following will discuss arrangements, shapes, and rotation angles of the first joint H1, the first rotator X1 defining the first rotation axis, the second joint H2, and the second rotator X2 defining the second rotation axis. Since the third and fourth joints H3 and H4 have substantially the same structure as that of the second joint H2, and since the fifth joint H5 has substantially the same structure as that of the first joint H1, a description about the third, fourth and fifth joints H3, H4 and H5 will be omitted in the interest of convenience. Since the third to fifth rotators X3 to X5 correspond to the second rotator X2, and since the sixth rotator X6 corresponds to the first rotator X1, a description about the third to sixth rotators X3 to X6 will be omitted in the interest of convenience.

The second rotator X2, which connects the first and second joints H1 and H2 to each other, may be disposed spaced apart at a first distance D1 from the first plane P1. Referring to FIG. 7, for example, the display device DD which is unfolded (e.g., flat) disposes the second rotator X2 spaced apart at a first distance D1 from the first plane P1, along the third direction DR3. The first distance D1 may correspond to the first distance D1 of FIG. 6, and may be the same as either the thickness of the protective panel CP shown in FIG. 6 or a sum of the thicknesses of the protective panel CP and the first adhesive layer OCA1 of FIG. 4.

In an embodiment, for example, the second rotator X2 and the second plane P2 may correspond to each other, e.g., overlap along a rotation direction or along the display module DM. That is, the second rotator X2 may be coplanar with the second plane P2. The first plane P1 may correspond to the rear surface of the display module DM (e.g., a rear surface of the protective panel CP). Alternatively, the first plane P1 may be a surface where the first and second module supporters SP1 and SP2 are in contact with (e.g., form an interface with) the display module DM. In an embodiment, for example, the second plane P2 may correspond to the rear surface of the display panel DP.

The second rotation axis defined by the second rotator X2 may be spaced apart at the first distance D1 from the first plane P1. In an embodiment, for example, the thickness of the protective panel CP may range from about 0.05 millimeters (mm) to about 0.2 mm. In this case, the first distance D1 may range from about 0.05 mm to about 0.2 mm. When the protective panel CP and the display panel DP are provided therebetween with an adhesive layer whose thickness is about 0.025 mm, the first distance D1 may range from about 0.075 mm to about 0.225 mm. Since the second rotation axis is disposed adjacent to the display panel DP, the neutral surface (see neutral plane NP of FIG. 6) may be provided relatively close to the display panel DP. The second rotation axis is closer to the display panel DP than the first rotation axis. Therefore, the display panel DP may be provided with a reduced stress. In an embodiment, the first rotation axis and the second rotation axis may be between the first plane P1 and the second plane P2, but are not limited thereto.

The first rotator X1, which connects the first joint H1 and the first module supporter SP1 to each other, may be disposed spaced apart at a second distance D2 from the first plane P1. The second distance D2 may be less the first distance D1. When the display module DM is folded as illustrated in FIG. 8, the display module DM may be provided with a variation in stress at a beginning region at which bending begins, or at a beginning region or outer bending region corresponding to the first rotator X1. The variation in stress at the outer bending region may be greater than a variation in stress provided to other regions of the display module DM that correspond to the second to fifth rotators X2 to X5 (e.g., inner bending region). To reduce the variation in stress, the first rotation axis may be provided spaced apart from the first plane P1 at a distance less than the first distance D1.

In an embodiment, for example, when the display module DM is folded, a portion of the display module DM corresponding to the first rotator X1 may experience force toward a non-folding region (e.g., NFA1 of FIG. 2) along the first plane P1, and also experience force in an opposite direction which is toward a folding region (e.g., FA of FIG. 2) along the second plane P2. The first rotation axis may lie between the first and second planes P1 and P2, which may result in a reduction in stress applied in opposite directions.

The second distance D2 may be determined in consideration of an angle about which the first rotator X1 is rotatable, based on the first joint H1 and the first module supporter SP1. In an embodiment, for example, the first rotator X1 may rotate as much as a first angle a1 (e.g., first rotation angle) based on shapes of the first joint H1 and the first module supporter SP1. The second rotator X2 may rotate as much as a second angle a2 (e.g., a second rotation angle), which is greater than the first angle a1, based on shapes of the first and second joints H1 and H2. Even though the first rotation axis is further away from the display panel DP than the second rotation axis, since the first angle a1 is less than the second angle a2, the tensile stress TS applied to the display panel DP may be reduced so as to not to induce damage to the display panel DP. The first angle a1 and the second angle a2 may be a maximum angle at which adjacent members are rotatable relative to each other, without being limited thereto.

A ratio of the second distance D2 to the first distance D1 may be the same as a ratio of the first angle a1 to the second angle a2. In an embodiment, for example, the first angle a1 may be about half the second angle a2, and in turn, the second distance D2 may be about half the first distance D1. In an embodiment, the second distance D2 defined between the first plane P1 and the first rotation axis defined by the first rotator X1 may be in a range from about 0.025 mm to about 0.1 mm, and the first distance D1 defined between the first plane P1 and the second rotation axis defined by the second rotator X2 may be in a range from about 0.05 mm to about 0.2 mm, without being limited thereto.

As illustrated in FIG. 8, the first module supporter SP1 may be in contact with the first joint H1 at a side surface of the first module supporter SP1 which is parallel to the third direction DR3. As shown in FIG. 7, the first angle a1 may be defined between a first side surface of the first joint H1 and the side surface of the first module supporter SP1. As also shown in FIG. 7, the second angle a2 may be defined between a second side surface of the first joint H1 which is opposite to the first side surface thereof, and a first side surface of the second joint H2. The second angle a2 may be divided into halves along the third direction DR3. To achieve this configuration, an angle (e.g., side surface angle) formed by opposite side surfaces of the first joint H1 which are virtually extended to meet each other, may be the same as an angle formed by opposite side surfaces of the second joint H2 which are virtually extended to meet each other. Referring to FIG. 7, for example, such opposite side surfaces are disposed below the various rotators and are inclined such that virtual extensions of the opposite side surfaces along a direction opposite to the third direction DR3, meet each other to define the side surface angle.

Figure 9:
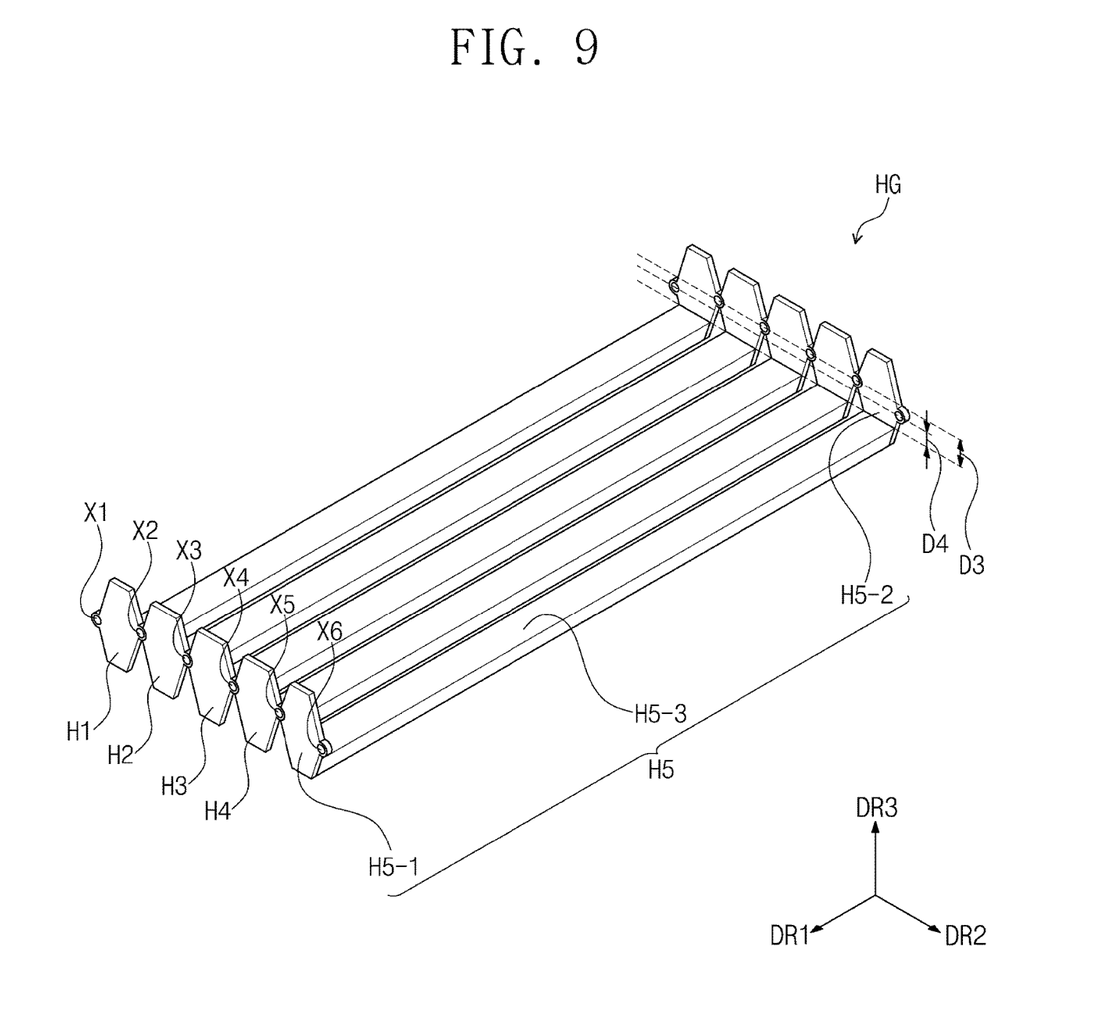
FIG. 9 illustrates a perspective view showing an embodiment of a hinge of FIG. 3.

FIG. 9 illustrates a perspective view showing an embodiment of the hinge HG of FIG. 3. Referring to FIG. 9, the hinge HG may include a first end and a second end opposing each other along the folding axis FX (e.g., along first direction DR1), first to fifth joints H1 to H5, which correspond to the first to fifth joints H1 to H5 shown in FIGS. 7 and 8, and first to sixth rotators X1 to X6, which correspond to the first to sixth rotators X1 to X6 shown in FIGS. 7 and 8. Each of the first to fifth joints H1 to H5 may be respectively connected to another joint or a module supporter through first to sixth rotators X1 to X6. The first to fifth joints H1 to H5 may be rotatable about first to sixth rotation axes defined by the first to sixth rotators X1 to X6.

Since the first to fifth joints H1 to H5 have the same or similar structures, the following will mainly explain the structure of the fifth joint H5. The structure of the fifth joint H5 discussed below may be applicable to each of the first to fourth joints H1 to H4. Within the hinge HG, the first joint H1 and the fifth joint H5 may be considered an outer joint, while the second, third and fourth joints H2, H3 and H4 may be considered an inner joint. The fifth joint H5 may include a first joint block H5-1 (e.g., first end member), a second joint block H5-2 (e.g., second end member), and a connector H5-3.

At a same first end of the hinge HG, the first joint block H5-1 may be disposed between a first joint block of the fourth joint H4 and the second module supporter SP2 of FIG. 3, along the second direction DR2. The first joint block H5-1 may rotate about the fifth rotator X5 and/or the sixth rotator X6. The first joint block H5-1 may be connected to an end of the second sidewall part WP2 of FIG. 3. The first joint block H5-1 may determine a rotation angle of the fifth joint H5, such as through a shape and/or side surfaces of the first joint block H5-1.

At a same second end of the hinge HG which is opposite to the second end thereof, the second joint block H5-2 may be disposed between a second joint block of the fourth joint H4 and the second module supporter SP2 of FIG. 3, along the second direction DR2. The second joint block H5-2 may face the first joint block H5-1 along the first direction DR1 with the display module DM of FIG. 1 between the first and second joint blocks H5-1 and H5-2 which face each other. The second joint block H5-2 may have the same shape as that of the first joint block H5-1.

The connector H5-3 may lengthwise extend along the first direction DR1 from the first joint block H5-1 or the second joint block H5-2. The connector H5-3 may have a first end that extends from the first joint block H5-1 and a second end which is opposite to the first end and extends from the second joint block H5-2. The connector H5-3 and the display module DM of FIG. 1 may overlap along the third direction DR3. The connector H5-3 may be connected to the first and second joint blocks H5-1 and H5-2, at the first and second ends of the connector H5-3, respectively, such that the first and second joint blocks H5-1 and H5-2 may rotate at the same angle as each other.

Referring to FIGS. 7, 8 and 9, for example, the display device DD which is folded about the folding axis FX disposes the second side surface (right) and the first side surface (left) of the first joint block H5-1 of the fifth joint H5, contacting the sidewall portion WP2 of the module supporter SP and the second side surface (right) of the first joint block H5-1 of the fourth joint H4, respectively.

At a location spaced apart at a first distance D3 from a plane along which the second to fifth rotation axes are commonly disposed, the connector H5-3 may be connected to each of the first and second joint blocks H5-1 and H5-2. The plane along which the second to fifth rotation axes are commonly disposed may correspond to the second plane P2 shown in FIGS. 7 and 8, without being limited thereto.

At a location spaced apart at a second distance D4 from a plane along which the first and sixth rotation axes are commonly disposed, the connector H5-3 may be connected to each of the first and second joint blocks H5-1 and H5-2. The plane along which the first and sixth rotation axes are commonly disposed may correspond to the first plane P1 shown in FIGS. 7 and 8, without being limited thereto. That is, connection points of the connector H5-3 relative to the first and second joint blocks H5-1 and H5-2, are at different distances from the first to sixth rotation axes within the hinge HG. The connection points of the connector H5-3 relative to the first and second joint blocks H5-1 and H5-2, may be coplanar with each other within the hinge HG, such as disposed along the first plane P1, without being limited thereto.

In an embodiment, the connector H5-3 may be connected to the first and second joint blocks H5-1 and H5-2 at locations lower than the first and second planes P1 and P2 (e.g., along the direction opposite to the third direction DR3 in FIG. 9), such that a space may be provided in which the display module DM is accommodated. In consideration of the space in which the display module DM is accommodated and of a space enough to allow folding of the display module DM, the first distance D3 may be greater than the first distance D1 shown in FIGS. 7 and 8. In alternative or in addition, the second distance D4 may be greater than the second distance D2 shown in FIGS. 7 and 8. In such configurations, the fifth joint H5 may have a structure configured to place a rotation axis in position adjacent to the display panel DP while providing the space in which the display module DM is accommodated and foldable.

According to one or more embodiment mentioned above, a rotation axis of a hinge HG may be disposed adjacent to a display panel DP within a display device DD, such that a bending stress provided to the display panel DP is reduced in folding of the display device DD.

Moreover, a position of the rotation axis may be determined in consideration of an angle about which the hinge HG is rotatable, and as a result, a display module DM which is foldable may have increased reliability.

Although embodiments have been described with reference to a number of illustrative examples thereof, it will be understood by those of ordinary skill in the art that various changes in form and details may be made without departing from the spirit and scope of the invention as set forth in the following claims.

Thus, the technical scope of the invention is not limited by the embodiments and examples described above, but by the following claims.

What is claimed is:

1. A display device, comprising:
    a display module corresponding to a folding region at which the display device is foldable and a non-folding region which is adjacent to the folding region;
    a module supporter corresponding to the non-folding region and in which the display module is received; and
    a hinge corresponding to the folding region and rotatably connected to the module supporter, the hinge including:
        a first joint and a second joint in order along the display module, from the module supporter,
        a first rotator which rotatably connects the module supporter to the first joint, and
        a second rotator which rotatably connects the first joint to the second joint,
    wherein
    the display module includes a first plane facing the module supporter, and
    a distance between the second rotator and the first plane is greater than a distance between the first rotator and the first plane.

2. The display device of claim 1, wherein the display module further includes:
    a second plane which faces the first plane;
    a protective panel corresponding to the module supporter and the hinge, the protective panel defining the first plane; and
    a display panel corresponding to the module supporter and the hinge, the display panel defining the second plane.

3. The display device of claim 2, wherein the second rotator is closer to the second plane than the first rotator.

4. The display device of claim 2, wherein the first rotator defines a first rotation axis in a plane between the first plane and the second plane.

5. The display device of claim 2, wherein the second rotator defines a second rotation axis in the second plane.

6. The display device of claim 1, wherein
the first rotator defines a first rotation axis and the second rotator defines a second rotation axis;
a first distance is defined between the first plane and the first rotation axis and a second distance is defined between the first plane and the second rotation axis; and
the first distance is less than the second distance.

7. The display device of claim 6, wherein the first distance is half the second distance.

8. The display device of claim 6, wherein
the module supporter and the first joint are rotatable about the first rotation axis at a first angle;
the first joint and the second joint are rotatable about the second rotation axis at a second angle; and
the first angle is less than the second angle.

9. The display device of claim 8, wherein a ratio of the second angle to the first angle corresponds to a ratio of the second distance to the first distance.

10. The display device of claim 8, wherein the first angle is half the second angle.

11. The display device of claim 6, wherein the display module further includes:
a protective panel corresponding to the module supporter and the hinge, the protective panel having a thickness in a range from about 0.05 millimeter to 0.2 about millimeter; and
a display panel corresponding to the module supporter and the hinge,
wherein
the protective panel having the thickness in the range from about 0.05 millimeter to 0.2 about millimeter, defines the first plane,
the first distance defined between the first plane and the first rotation axis is in a range from about 0.025 millimeter to about 0.1 millimeter, and
the second distance defined between the first plane and the second rotation axis is in a range from about 0.05 millimeter to about 0.2 millimeter.

12. The display device of claim 1, wherein
the display device is folded about a folding axis,
the display module further includes:
a display panel corresponding to the module supporter and the hinge, and
a second plane which faces the first plane and is closer to the display panel than the first plane, and
the folding axis is closer to the first plane than to the second plane.

13. The display device of claim 1, wherein
the module supporter includes:
a bottom portion corresponding to the non-folding region; and
a sidewall portion extended from the bottom portion and in which the display module is received, and
the first rotator is rotatably connected to the module supporter at the sidewall portion thereof.

14. The display device of claim 13, wherein
the display device is folded about a folding axis,
the hinge further includes a first end and a second end opposing each other along the folding axis, and
at the first end of the hinge:
the first joint of the hinge includes:
a first joint block rotatably connected to a first end of the sidewall portion by the first rotator; and
a first connector extended along the folding axis, from the first joint block toward the second end of the hinge, and the second joint of the hinge includes:
a second joint block rotatably connected to the first joint block by the second rotator; and
a second connector extended along the folding axis, from the second joint block toward the second end of the hinge.

15. The display device of claim 14, wherein
the first joint block includes:
a first side surface facing the sidewall portion; and
a second side surface opposite to the first side surface and facing the second joint block, the second side surface forming a first angle with the first side surface, and
the second joint block includes:
a first side surface which faces the second side surface of the first joint block; and
a second side surface which is opposite to the first side surface of the second joint block, the second side surface of the second joint block forming a second angle with the first side surface of the second joint block, the second angle being the same as the first angle,
wherein the display device which is folded about the folding axis disposes the first side surface and the second side surface of the first joint block, contacting the sidewall portion of the module supporter and the first side surface of the second joint block, respectively.

16. A display device, comprising:
a display module corresponding to a folding region at which the display device is foldable and a non-folding region which is adjacent to the folding region;
a module supporter corresponding to the non-folding region and in which the display module is received, the module supporter including a bottom portion and a sidewall portion which extends from the bottom portion; and
a hinge corresponding to the folding region and rotatably connected to the module supporter,
wherein
the display module includes a first plane facing the bottom portion of the module supporter,
the hinge includes a first joint and a second joint in order along the display module, from the module supporter,
the first joint and the second joint are rotatably connected to each other about a first rotation axis,
the module supporter and the first joint are rotatably connected to each other about a second rotation axis, and
a first distance between the first rotation axis and the first plane is greater than a second distance between the second rotation axis and the first plane.

17. The display device of claim 16, wherein the display module further includes:
a second plane which faces the first plane;
a display panel corresponding to the bottom portion of the module supporter and the hinge, the display panel defining the second plane; and
a protective panel between the bottom portion of the module supporter and the display panel, the protective panel defining the first plane wherein the second rotation axis is between the first plane and the second plane.

18. The display device of claim 17, wherein the first distance corresponds to a thickness of the protective panel.

19. The display device of claim 17, wherein the display module further includes an adhesive layer between the protective panel and the display panel, and the first distance corresponds to a sum of a thickness of the protective panel and a thickness of the adhesive layer.

20. The display device of claim 16, wherein the first joint and the second joint are rotatable about the first rotation axis at a first angle, the module supporter and the first joint are rotatable about the second rotation axis at a second angle, and the first angle is greater than the second angle.

* * * * *